(12) United States Patent
Matsumoto et al.

(10) Patent No.: US 7,307,803 B2
(45) Date of Patent: Dec. 11, 2007

(54) ZOOM LENS DEVICE

(75) Inventors: Satoru Matsumoto, Saitama (JP); Tetsuo Kamigaki, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 11/727,117

(22) Filed: Mar. 23, 2007

(65) Prior Publication Data

US 2007/0229980 A1 Oct. 4, 2007

(30) Foreign Application Priority Data

Mar. 28, 2006 (JP) ............................ P2006-087941

(51) Int. Cl.
*G02B 7/02* (2006.01)
(52) U.S. Cl. ...................... 359/819; 359/821; 359/822
(58) Field of Classification Search ................ 359/819, 359/821, 822, 823, 824, 825, 826, 829, 811, 359/813

See application file for complete search history.

(56) References Cited

FOREIGN PATENT DOCUMENTS

JP        4-57007 A        2/1992

*Primary Examiner*—Timothy J. Thompson
(74) *Attorney, Agent, or Firm*—Birch, Stewart, Kolasch & Birch, LLP

(57) ABSTRACT

A cam barrel 19 rotates in one way in varying a power to move four lens holding frames in the same direction by displacements of four cam openings 33 to 36. Cam barrel cam followers 48 are provided on an outer periphery of the cam barrel 19. The cam barrel cam followers 48 are passed through cam barrel cam openings 47 provided to a fixed barrel being arranged on an outer periphery of the cam barrel 19, and engage with a power variation driving ring arranged on an outer periphery of the fixed barrel. The power variation driving ring is used to rotate the cam barrel 19 and move respective lens holding frames. Since the cam barrel cam followers 48 engage with the cam barrel cam openings 47, the cam barrel 19 is moved according to displacements of the cam barrel cam openings 47 while holding respective lens holding frames.

1 Claim, 5 Drawing Sheets

WIDE END

FIG. 2 TELE END

WIDE END

TELE END

ZOOM LENS DEVICE

BACKGROUND OF THE INVENTION

1. Technical Field

The invention relates to a zoom lens device for moving plural lens holding frames simultaneously in an optical axis direction by rotating a cam barrel with respect to a fixed barrel.

2. Description of the Related Art

For example, JP Hei. 4-57007 A discloses a zoom lens device including a cam mechanism, which causes a lens group held by the lens holding frame to move in an optical axis direction by rotating a cum barrel with respect to a fixed barrel during varying of power and guiding a cam follower provided on the lens holding frame to an intersection point between a cam face provided spirally on the cam barrel and a straight moving guiding face provided in the fixed barrel.

A higher power of the zooming power and a reduction in size are required of zoom lens devices. In order to attain a higher power, it is necessary to set a displace amount of the cam face in the optical axis direction to be long to extend a movement amount of lens groups constituting the zoom lens. Also, in order to move simultaneously plural lens groups each having a different movement amount during varying of a power by using one cam barrel, it is necessary to form plural cam faces, whose displace amount in the optical axis direction are long, in on the cam barrel. In this case, if a diameter of the cam barrel is small, an angle between the cam faces and the rotation direction become sharp. A large torque is required to rotate the cam face, and also it is difficult to move the cam follower smoothly. As a result, it is the present situation that it is necessary to increase a diameter of the can barrel contrary to a demand for compactification.

SUMMARY OF THE INVENTION

In view of the above circumstances, the invention has been made and provides a zoom lens device, which can move respective lens groups smoothly even if one cam barrel for moving plural lens groups having a different movement amount respectively is formed to have a small diameter.

In order to attain the above object, a zoom lens device includes a fixed barrel, a plurality of lens holding frames, a cam barrel, cams, cam barrel cams, cam barrel cam followers and a power variation driving ring. The fixed barrel is formed with straight forward guide openings. The plurality of lens holding frames hold lens groups, which are respectively moved different movement amounts during varying of a power. Cam followers that engage with the straight forward guide openings are provided on an outer periphery of the lens holding frames. The cam barrel is supported inside the fixed barrel so as to be rotatable and movable in an optical axis direction. The cam barrel holds the plurality of lens holding frames inside the cam barrel so that the plurality of lens holding frames are movable in the optical axis direction. The cams are formed on the cam barrel to engage with the cam followers, respectively. The cams are formed to have an inclination in such a manner that when the cam barrel is rotated in one way in a circumferential direction on an optical axis, all the lens holding frames are moved with respect to the fixed barrel in one way in the optical axis direction. The cam barrel cams are provided in the fixed barrel. The cam barrel cam followers are provided to protrude from the cam barrel to engage with the cam barrel cams. The power variation driving ring is provided on an outer periphery of the fixed barrel so as to be rotatable and movable in the optical axis direction. The power variation driving ring is engaged with top ends of the cam barrel cam followers to apply a rotating force to the cam barrel. The cam barrel cam openings are formed to have an inclination in such a manner that when the power variation driving ring is rotated in the one way in the circumferential direction on the optical axis, the cam barrel is moved in the same direction as a direction in which the cams move the lens holding frames.

With this configuration, when the power variation driving ring is rotated in the one way in the circumferential direction on the optical axis, the cam barrel is rotated together with the power variation driving ring because the cam barrel is coupled to the power variation driving ring via the cam barrel cam followers, and also the cam barrel is moved in the optical axis direction according to displacements of the cam barrel cam openings while holding the respective lens holding frames because the cam barrel cam followers engage with the cam barrel cam openings. Also, when the cam barrel is rotated, the respective lens holding frames are moved with respect to the cam barrel in the optical axis direction. The respective cams are formed to incline in such a direction that when the cam barrel is rotated in the one way, the respective lens holding frames are moved in the one way of the optical axis direction, i.e., in the same direction. Also, the cam barrel cam openings are formed to incline in such a direction that the cam barrel is moved in the same direction as that of the lens holding frames.

Accordingly, the respective lens holding frames are moved with respect to the fixed barrel in the one way of the optical axis direction a distance obtained by adding the displacement amount of the cam barrel to the displacement amounts of the respective cams provided in the cam barrel. In other words, the respective movement amounts of the lens holding frames, which are required during varying of a power, are allotted separately to displacements of respective cams provided in the cam barrel and movements of the cam barrel cam openings used to move the cam barrel itself. Therefore, when the cam barrel cams are formed in a shape that has a large displacement amount in the optical axis direction respectively, the respective cams provided in the cam barrel can be formed in a shape that has a small displacement amount in the optical axis direction. As a result, even when a diameter of the cam barrel is small, the cams can be formed to have a gentle inclination. Thus, the respective lens holding frames can be moved smoothly. Also, if the cam barrel cams are formed in a shape, which provides large displacement amount in the optical axis direction, normally an inclination of the cam barrel cams becomes sharp. However, the invention has such an advantage that since the cam barrel cams are provided on the fixed barrel being arranged on the outer periphery of the cam barrel, such cam barrel cams can be formed to have a gentle inclination rather than the case where such cam barrel cams are formed on the cam barrel because the fixed barrel is larger in diameter than the cam barrel.

According to the invention, the movement amounts of the respective lens holding frames required during the varying of the power are allotted separately to displacements of the cams provided in the cam barrel in the optical axis direction and a displacement of the cam barrel cam openings in the optical axis direction applied to move the cam barrel itself. Therefore, the inclination of the respective cams can be formed gently and thus a diameter of the cam barrel can be set small.

DETAILED DESCRIPTION OF EMBODIMENTS OF THE INVENTION

Figure 1:
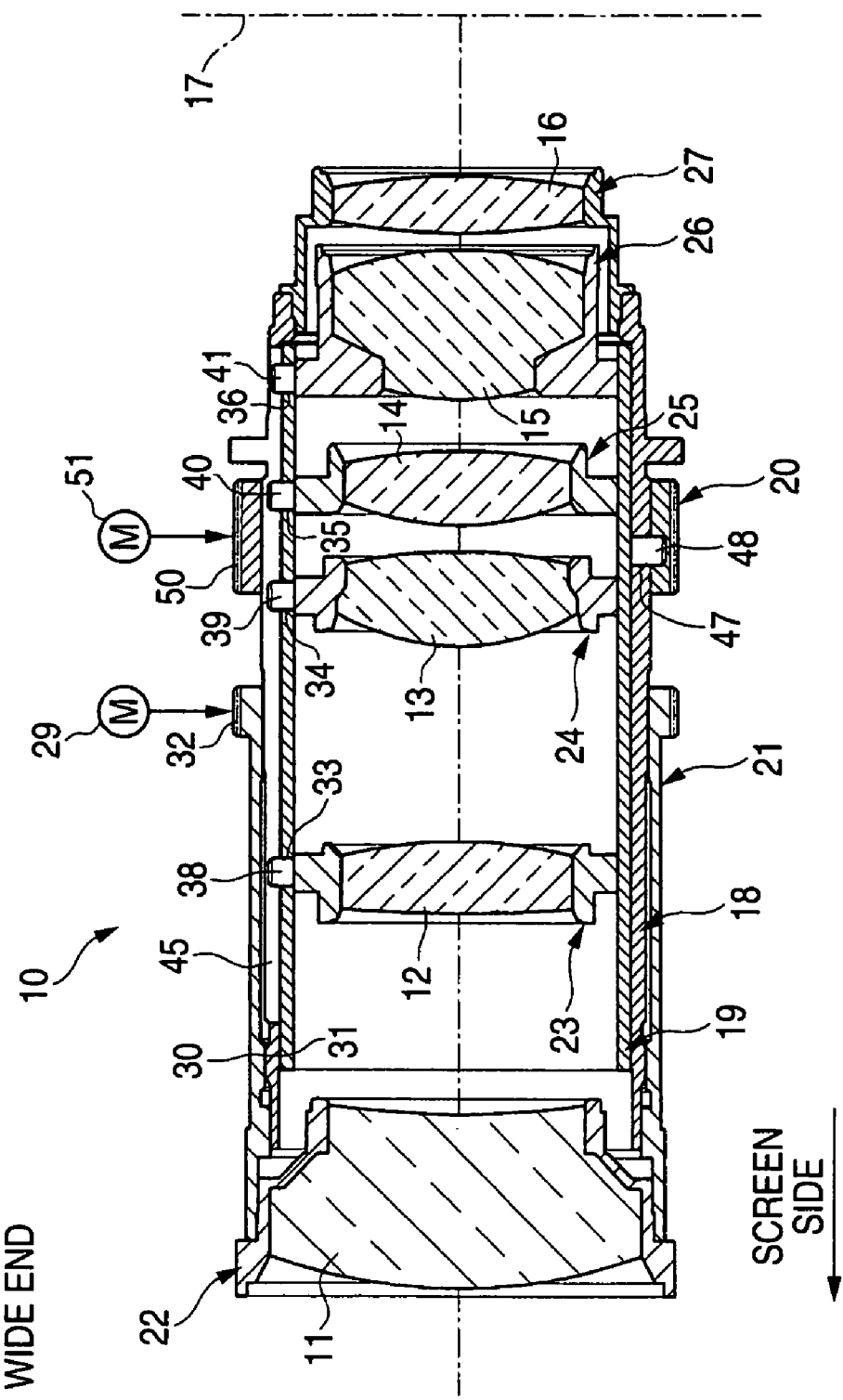
FIG. 1 is a section view showing a zoom lens device according to an embodiment of the invention, and showing a state at the WIDE end.
Figure 2:
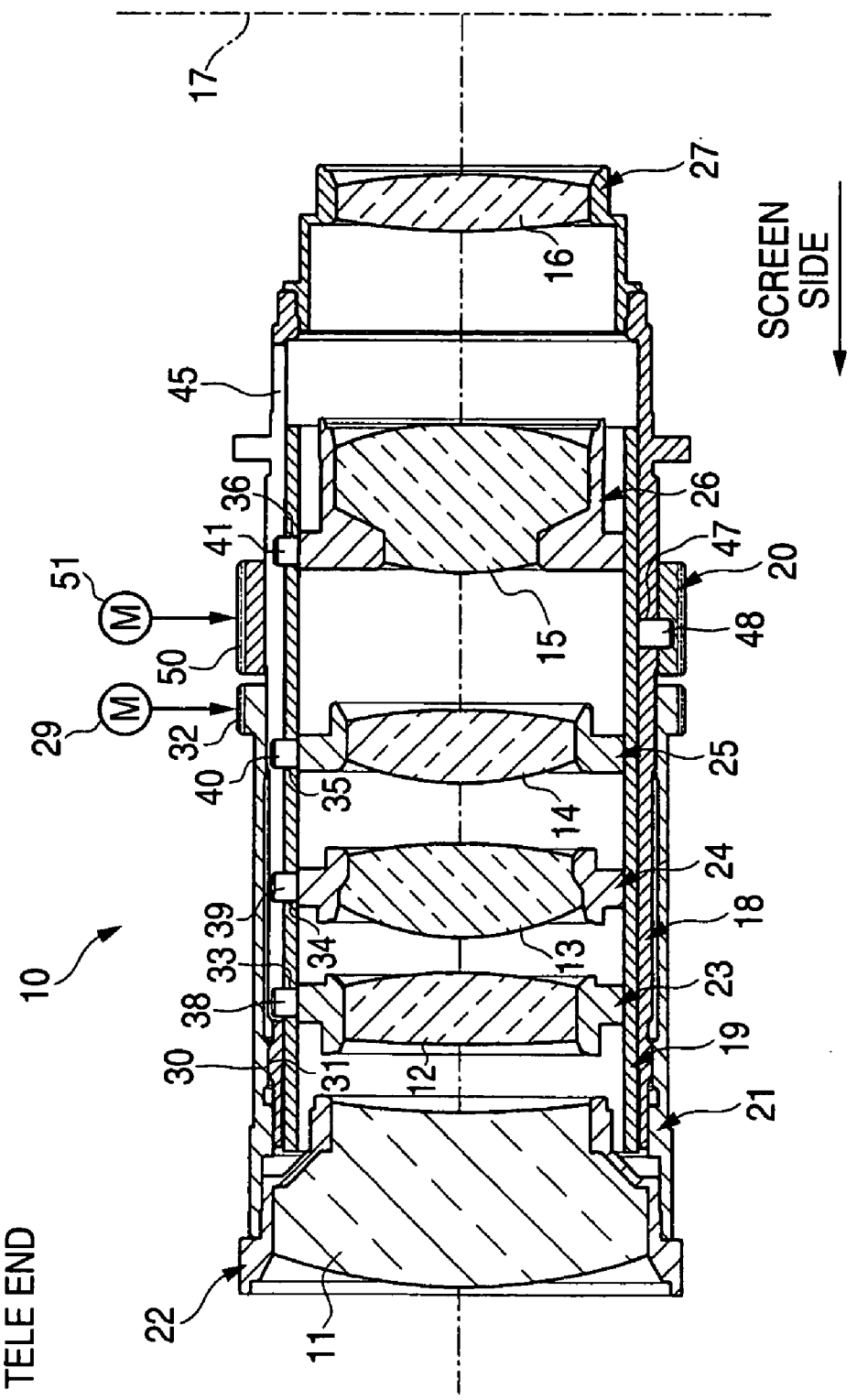
FIG. 2 is a section view showing the zoom lens device according to the embodiment of the invention, and showing a state at the TELE end.
Figure 3:
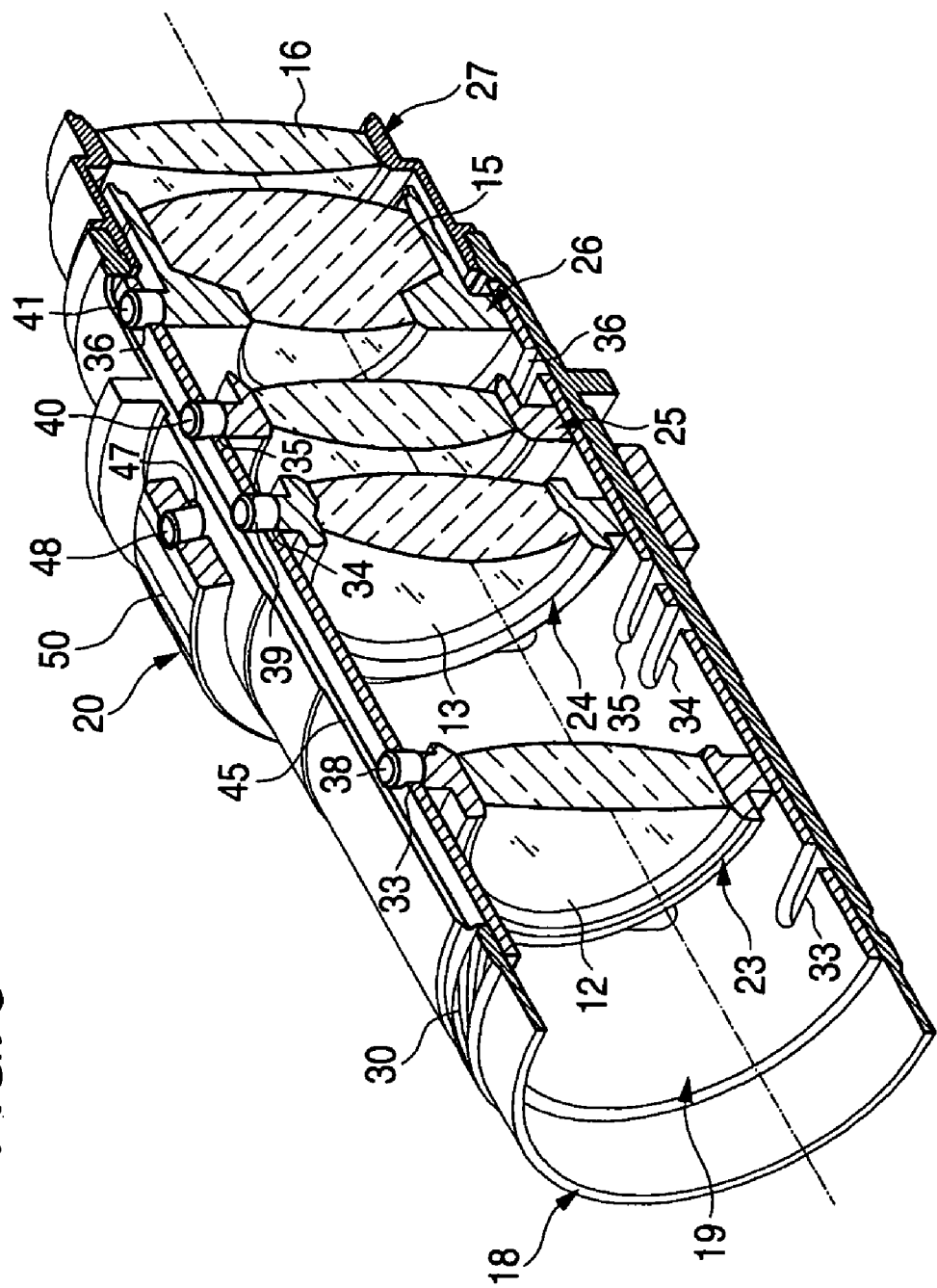
FIG. 3 is a perspective view showing the zoom lens device taken along the optical axis longitudinally, in which a focus driving ring is omitted from illustration.

A zoom lens device 10 may be used in a projector. As shown in FIGS. 1 to 3, the zoom lens device 10 has first to sixth lens groups 11 to 16 in order from a screen side (objective side). The first lens group 11, which is the front lens, is moved in an optical axis direction in focusing. The second to five lens groups 12 to 15 are moved in the optical axis direction respectively during varying of a power. In this case, the sixth lens group 16 is fixed. Also, a reference numeral 17 denotes a surface on which an original to be projected is placed. For example, a liquid crystal panel of the liquid crystal projector is disposed on that surface.

A lens barrel of the zoom lens device 10 includes a fixed barrel 18, a cam barrel 19, a power variation driving ring 20, a focus driving ring 21 and first to sixth lens holding frames 22 to 27, which hold the first to sixth lens groups 11 to 16, respectively. The sixth lens holding frame 27 is fixed to the rear end of the fixed barrel 18. The cam barrel 19 is disposed on an inner periphery of the fixed barrel 18. The focus driving ring 21 is disposed on a front-end outer periphery of the fixed barrel 18. The power variation driving ring 20 is disposed on a middle outer periphery of the fixed barrel 18.

The fixed barrel 18 is formed into a long barrel shape that covers an overall outer periphery of the cam barrel 19 and extends to be longer than the cam barrel 19 toward both sides of the optical axis direction. The first lens holding frame 22 is fixed to a front end of the focus driving ring 21. A rear end of the focus driving ring 21 is fitted to the outer periphery of the fixed barrel 18. The fixed barrel 18 and the focus driving ring 21 are coupled via male and female helicoids 30, 31. When a driving force is input from a focus motor 29 into its gear train 32 provided on the outer periphery of the focus driving ring, the focus driving ring 21 is moved together with the first lens holding frame 22 in the optical axis direction in accordance with lead of the male and female helicoids 30, 31 while rotating with respect to the fixed barrel 18.

The second to fifth lens holding frames 23 to 26 are housed in the inside of the cam barrel 19 so as to be movable in the optical axis direction. Also, four cam openings 33 to 36 are formed in the outer periphery of the cam barrel 19. The cam openings 33 to 36 are provided to move the second to fifth lens holding frames 23 to 26 in the optical axis direction independently in response to rotating of the cam barrel 19. The cam openings 33 to 36 corresponding to the second to fifth lens holding frames 23 to 26 are formed at tripartition positions in the circumferential direction, respectively. Also, cam followers 38 to 41 are provided in tripartition positions on the outer peripheries of the second to fifth lens holding frames 23 to 26, respectively. These cam followers 38 to 41 engage with the cam openings 33 to 36, respectively. In addition, a straight forward guide opening 45 is formed in tripartition positions of the fixed barrel 18 in the circumferential direction, respectively. The straight forward guide openings 45 are formed to extend long in the optical axis direction. The cam followers 38 to 41 engage with the straight forward guide openings 45 to stop rotating of the second to fifth lens holding frames 23 to 26.

In addition to the straight forward guide openings 45, cam barrel cam openings 47, each of which has a cam face to move the cam barrel 19 in the optical axis direction, are formed in the fixed barrel 18. Also, the cam barrel cam openings 47 are formed at tripartition positions in the circumferential direction, respectively. Cam barrel cam followers 48 fixed to the outer periphery of the cam barrel 19 engage with the cam faces of the cam barrel cam openings 47.

The power variation driving ring 20 is fitted to the outer periphery of the fixed barrel 18 so to be rotatable in the circumferential direction and movable in the optical axis direction. Top ends of the cam barrel cam followers 48 are fixed to the power variation driving ring 20. That is, the power variation driving ring 20 and the cam barrel 19 are coupled to each other so that they are rotated together by the cam barrel cam followers 48 via the cam barrel cam openings 47 of the fixed barrel 18.

A gear train 50 is formed on the outer periphery of the power variation driving ring 20. A driving force is input into the gear train 50 from a power varying motor 51. When receiving the driving force, the power variation driving ring 20 is moved with respect to the fixed barrel 18 in the optical axis direction in response to a displacement of the cam barrel cam openings 47 while rotating with respect to the fixed barrel 18.

The cam barrel 19 is coupled to the power variation driving ring 20 via the cam barrel cam followers 48. Therefore, when the power variation driving ring 20 is rotated, the cam barrel 19 is moved in the optical axis direction in response to a displacement of the cam barrel cam followers 48 while rotating together with the power variation driving ring 20. Also, when the cam barrel 19 is rotated, the second to fifth lens holding frames 23 to 26 are moved in the optical axis direction in response to displacement of the cam openings 33 to 36, respectively as described above.

Figure 4:
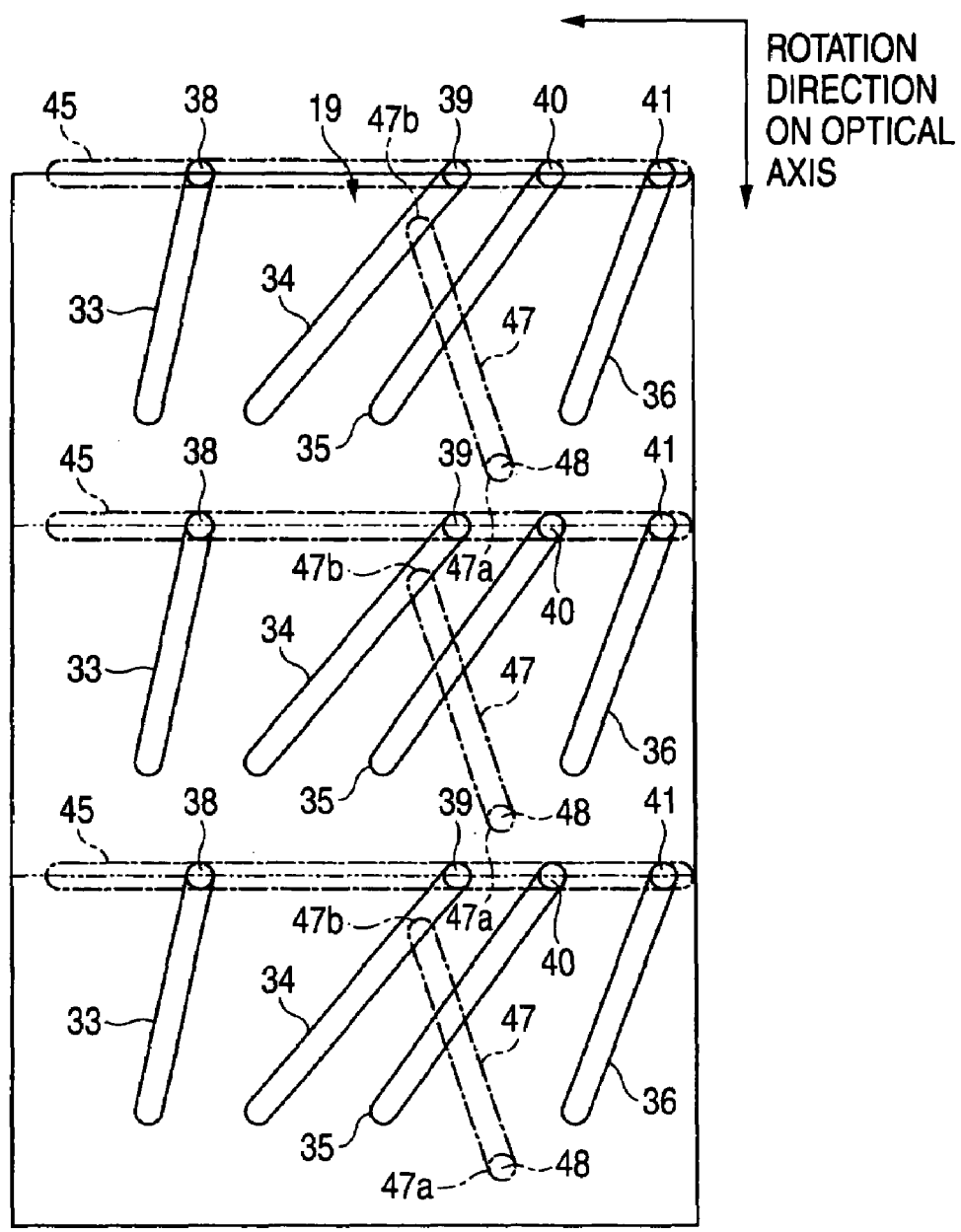
FIG. 4 is a development view showing a cam barrel, and showing a state at the WIDE end.
Figure 5:
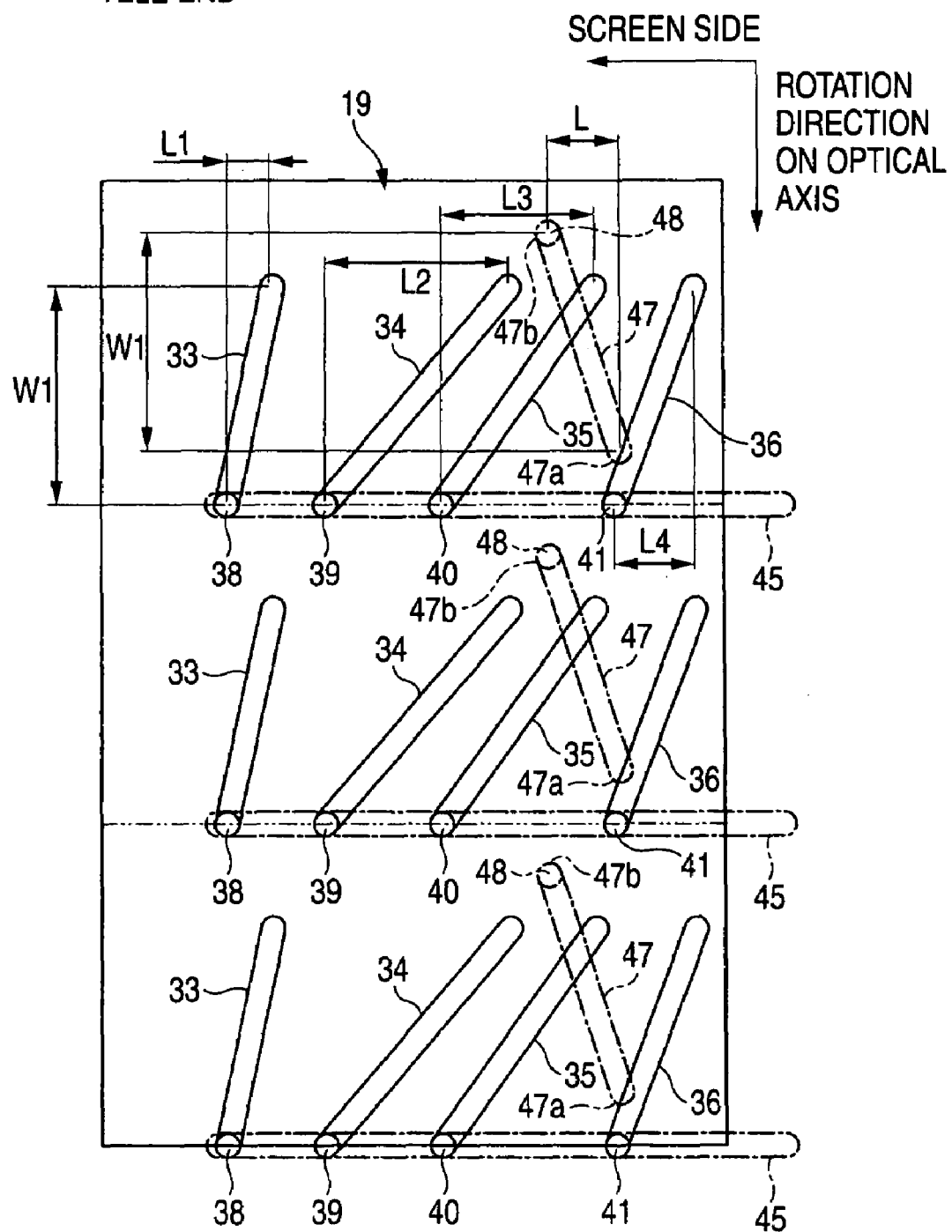
FIG. 5 is a development view showing the cam barrel, and showing a state at the TELE end.

FIG. 4 and FIG. 5 show development views of the cam barrel 19. The respective cam openings 33 to 36 are formed to have an inclination in such a manner that when a power is varied from the WIDE end to the TELE end, the second to fifth lens holding frames 23 to 26 are moved toward the screen side in the optical axis direction. Also, the cam barrel cam openings 47 are formed to have an inclination in such a manner that when a power is varied from the WIDE end to the TELE end, the cam barrel 19 is moved in the same direction as that in which the second to fifth lens holding frames 23 to 26 are moved. Here, the WIDE end of the zoom lens device 10 is the high power side at which a projection magnification is large to increase a screen size projected onto the screen. Also, the TELE end of the zoom lens device 10 is the low power side at which a projection magnification is small to lower a screen size projected onto the screen.

When a power is varied from the WIDE end to the TELE end by rotating the power variation driving ring 20, each cam barrel cam followers 48 are moved from one end 47a to the other end 47b of the corresponding cam barrel cam opening 47 and also the cam barrel 19 is moved together with this movement. These movement amounts are given by a length W1 shown in FIG. 5. Here, one end 47a and the other end 47b of each cam barrel cam opening 47 serve as a restricting portion that restricts a rotation range of the power variation driving ring 20 when the cam barrel cam followers 48 come into contact with any of these ends.

When the cam barrel cam follower 48 moves from one end 47a and the other end 47b of the cam barrel cam opening 47, the cam barrel 19 is rotated toward the TELE end direction out of the rotation direction of the power variation driving ring 20 and also the cam openings 33 to 36 are rotated. The cam followers 38 to 41, which engage with the cam openings 33 to 36, don't rotate because they engage with the straight forward guide openings 45. Thus, these cam followers 38 to 41 move to follow intersection points between the cam openings 33 to 36 and the straight forward guide openings 45.

Accordingly, the second lens holding frame 23 moves with respect to the fixed barrel 18 toward the screen side a length obtained by adding a displacement amount L1 of the cam opening 33 in the optical axis direction and a movement amount L of the cam barrel 19 in the optical axis direction. Also, the third lens holding frame 24 similarly moves with respect to the fixed barrel 18 toward the screen side a length obtained by adding a displacement amount L2 of the cam opening 34 in the optical axis direction and the movement amount L of the cam barrel 19 in the optical axis direction. Also, the fourth lens holding frame 25 similarly moves with respect to the fixed barrel 18 toward the screen side a length obtained by adding a displacement amount L3 of the cam opening 35 in the optical axis direction and the movement amount L of the cam barrel 19 in the optical axis direction. Also, the fifth lens holding frame 26 similarly moves with respect to the fixed barrel 18 toward the screen side a length obtained by adding a displacement amount L4 of the cam opening 36 in the optical axis direction and the movement amount L of the cam barrel 19 in the optical axis direction.

In other words, the respective movement amounts of the second to fifth lens holding frames 23 to 26 required in varying of a power are allotted separately to the displacements of the cam openings 33 to 36 in the optical axis direction and the movement of the cam barrel 19. Also, the cam barrel 19 is moved in the same direction as the moving direction of the second to fifth lens holding frames 23 to 26. Hence, the cam openings 33 to 36 can be formed on the cam barrel 19 as a helical shape whose displacement in the optical axis direction is short, i.e., a shape whose inclination is made small. Therefore, even if a diameter of the cam barrel 19 is small, the cam openings 33 to 36 can be formed to have a gentle inclination. As a result, all of four lens holding frames 23 to 26 can be moved smoothly even with a single small-diameter cam barrel 19.

In the above embodiment, four lens holding frames, i.e., the second to fifth lens holding frames 23 to 26 are moved in the same direction as the moving direction of the cam barrel 19 simultaneously when the cam barrel 19 is rotated in one direction. In this case, the number of lens holding frames is not limited to four, and any configuration may be employed if two or more lens holding frames are moved. The number of cam followers 38 to 41, 48 and cams 33 to 36, 47 is not limited to the illustrated number, and any number may be employed.

Also, in the above embodiment, the power variation driving ring 20 is driven automatically by the power varying motor 51. However, the power variation driving ring 20 may be driven manually with this power varying motor 51 being omitted.

Also, in the above embodiment, the invention is explained as the zoom lens device used in the projector. However, the invention is not limited thereto, and may be applied to an optical equipment using the optical system such as the photographic camera, the electronic camera, the copying machine, and the like.

What is claimed is:

1. A zoom lens device comprising:

a fixed barrel formed with straight forward guide openings;

a plurality of lens holding frames that hold lens groups, which are respectively moved different movement amounts during varying of a power, wherein cam followers that engage with the straight forward guide openings are provided on an outer periphery of the lens holding frames;

a cam barrel supported inside the fixed barrel so as to be rotatable and movable in an optical axis direction, the cam barrel that holds the plurality of lens holding frames inside the cam barrel so that the plurality of lens holding frames are movable in the optical axis direction;

cams formed on the cam barrel to engage with the cam followers, respectively, wherein the cams are formed to have an inclination in such a manner that when the cam barrel is rotated in one way in a circumferential direction on an optical axis, all the lens holding frames are moved with respect to the fixed barrel in one way in the optical axis direction;

cam barrel cams provided in the fixed barrel;

cam barrel cam followers provided to protrude from the cam barrel to engage with the cam barrel cams; and a power variation driving ring provided on an outer periphery of the fixed barrel so as to be rotatable and movable in the optical axis direction, the power variation driving ring engaged with top ends of the cam barrel cam followers to apply a rotating force to the cam barrel, wherein:

the cam barrel cam openings are formed to have an inclination in such a manner that when the power variation driving ring is rotated in the one way in the circumferential direction on the optical axis, the cam barrel is moved in the same direction as a direction in which the cams move the lens holding frames.

* * * * *